US006831996B1

(12) United States Patent
Williams et al.

(10) Patent No.: US 6,831,996 B1
(45) Date of Patent: Dec. 14, 2004

(54) METHOD FOR INSPECTING AN AUTOMOTIVE WHEEL AND ASSOCIATED APPARATUS

(75) Inventors: David B. Williams, Butler, PA (US); Robert J. Gephardt, New Kinsington, PA (US); Samuel A. Rummel, Butler, PA (US)

(73) Assignee: Oberg Industries, Freeport, PA (US)

( * ) Notice: Subject to any disclaimer, the term of this patent is extended or adjusted under 35 U.S.C. 154(b) by 609 days.

(21) Appl. No.: 09/961,655

(22) Filed: Sep. 24, 2001

(51) Int. Cl.[7] .................................................. G06R 9/00
(52) U.S. Cl. ........................ 382/141; 382/291; 348/86
(58) Field of Search ................................ 382/141, 143, 382/152, 291; 348/86, 125

(56) References Cited

U.S. PATENT DOCUMENTS

| | | | |
|---|---|---|---|
| 3,781,798 A | | 12/1973 | Hinks |
| 3,801,957 A | | 4/1974 | Hogan |
| 3,810,159 A | | 5/1974 | Hinks |
| 3,930,141 A | | 12/1975 | Koyama et al. |
| 4,700,078 A | | 10/1987 | Mizuno et al. |
| 4,727,419 A | * | 2/1988 | Yamada et al. .............. 382/141 |
| 5,054,918 A | | 10/1991 | Downing et al. |
| 6,124,925 A | | 9/2000 | Kaneko et al. |
| 6,151,407 A | | 11/2000 | Conlon et al. |
| 6,226,081 B1 | | 5/2001 | Fantone et al. |
| 6,417,918 B1 | * | 7/2002 | Anno et al. .............. 356/237.1 |

* cited by examiner

*Primary Examiner*—Jon Chang
*Assistant Examiner*—Chong Kim
(74) *Attorney, Agent, or Firm*—Arnold B. Silverman; Eckert Seamans Cherin & Mellott, LLC

(57) ABSTRACT

A method of inspecting an automotive wheel includes providing an inspection station having a light source for illuminating the wheel, and a camera having a zoom lens. The automotive wheel is positioned in the inspection station and the wheel is illuminated to generate a first image including the reference feature. After the first image information has been delivered to the processor, the model of the automotive wheel is determined on the basis of data stored in the processor and the parameters to be used during the inspection of the particular model are employed in the subsequent inspection. The processor determines the position of the reference feature and determines whether the automotive wheel is in the desired position. If not, the wheel is rotated to move the reference feature toward the desired position. The light source, camera and zoom lens are then moved to a second position closer to the reference feature and a zoomed second image of the automotive wheel is obtained with the image second information being compared in the processor with the desired reference position location. If the reference feature is not in the desired position, the processor initiates further rotation to move the reference feature to the desired position. The zoomed second image has a smaller field of view than the first image. Related apparatus is also disclosed.

30 Claims, 4 Drawing Sheets

METHOD FOR INSPECTING AN AUTOMOTIVE WHEEL AND ASSOCIATED APPARATUS

BACKGROUND OF THE INVENTION

1. Field of the Invention

The present invention relates to an automated method and related apparatus for rapidly and efficiently inspecting automotive wheels of different models and, more specifically, it relates to such a system wherein hardware changes to the structure of the system are not required in order to permit conversion from inspection of one model automotive wheel to another.

2. Description of the Prior Art

Numerous means have been known for inspecting automotive tires to determine the identity or certain characteristics of the tire.

U.S. Pat. No. 3,810,159 discloses the use of a camera in reading an identification pattern on a tire by detecting temperature variations with an infrared sensor.

U.S. Pat. No. 3,781,798 discloses a mechanically contacting system, which is employed to detect markings on a tire.

U.S. Pat. No. 6,124,925 discloses a device for assessing the quality of a tire through the use of a reading device that reads a marking on a tire side wall which in turn provides an indication of tire dimensions. See also U.S. Pat. No. 3,801,957.

U.S. Pat. No. 5,054,918 discloses a tire identification system that employs rotation of the tire and detection of the tire dimensions employing a fixed light source and fixed camera.

U.S. Pat. No. 3,930,141 discloses a tire inspection system having a camera, which is horizontally moveable. A separate tire dimension-measuring device is employed. This system, therefore, discloses the use of a combination of a tire measurement device and a camera to detect classification marks on a tire.

U.S. Pat. No. 6,226,081 is not related to automotive wheels. It employs a zoom lens bearing camera in a bottle inspection system.

It has been known to employ an inspection system for identifying components on an electronic circuit board through the use of a camera and an annular florescent lamp.

U.S. Pat. No. 6,151,407 discloses an inspection system employing a camera and an annular florescent lamp.

U.S. Pat. No. 4,700,078 discloses a method of inspecting tires to read on a single tire type and size tire information marks which tend to identify tire kind, tire size and other characteristics. This system employs a camera adapted for orthogonal movement as well as an annular light source. It also is reading an information providing mark.

In spite of the foregoing prior art disclosures, there remains a very real and substantial need for a method and associated apparatus for inspection of an automotive wheel to determine the position of a reference feature such that the feature is employed as a positioning means for a position indicator so that the wheel may be provided in the precise desired orientation in order to facilitate subsequent machining or other fabricating operations on the wheel.

SUMMARY OF THE INVENTION

The present invention has met the hereinbefore described needs. More specifically, the preferred method of the present invention, an automotive wheel having a reference feature is randomly placed within an inspection station, which has a light source for illuminating the wheel and a camera having a zoom lens. The wheel is illuminated and the camera obtains an initial image of the wheel from a first position and delivers first image information to a processor. The processor employs this information to make a specific determination of which model automotive wheel is being inspected and employs parameters related to that specific model in inspecting the wheel. The processor determines the position of the reference feature and if it is not in the desired position, initiates rotation of the automotive wheel to move the reference feature toward the desired position. The light source, camera and zoom lens are then moved closer to the reference feature and the camera is employed to obtain a second image with second image information being delivered to the processor. The processor employs the second image information to determine if the reference feature is in the desired position and if not, initiates rotation of the automotive wheel to move the reference feature to the desired location. When the reference feature is in the desired final position, inspection of the wheel is effected. The wheel is either accepted or rejected. The wheel, if accepted, may then be removed such as by a robot, for example, to deliver it to a first fabricating stage while preserving the desired orientation. If the wheel is rejected it is removed as by an exit conveyor to permit inspection of the next wheel.

Apparatus of the preferred embodiment of the invention provides an automotive wheel support for receiving, elevating and rotating the automotive wheel. A light source, which may be an annular florescent light source, overlies the automotive wheel support as does a camera and zoom lens. First image information provides an initial image and determines what model wheel is being inspected and employs those parameters to determine if the reference feature is in a desired position and if not, initiates rotation of the automotive wheel to the desired position. The light source, camera and zoom lens are then moved to a position closer to the reference feature, and a zoomed second image is obtained by the camera with the zoomed second image information being delivered to the processor which, in turn, makes a comparison between the desired position for the reference feature of the particular automotive wheel model and the actual position and if there is a difference, initiates rotational movement of the automotive wheel to position the referenced feature in the desired location. After that, the automotive wheel is removed from the inspection station for delivery, in an indexed manner, to the first fabricating station. A controller controls operation of the units of the system responsive to output signals received from the processor.

It is an object of the present invention to provide a method and associated apparatus for efficient, rapid and accurate inspection of an automotive wheel to make sure that a reference feature is in a proper location for the subsequent fabrication operations.

It is another object of the present invention to provide such a system, which can readily identify the model of automotive wheel being inspected, and adjust to changes in model without requiring hardware changes to the structure of the inspection station.

It is another object of the present invention to provide such a system wherein a plurality of stages of rotational movement of the automotive wheel, pursuant to control signals issued by a processor, may be employed to establish the desired reference feature position.

It is another object of the present invention to provide such a system, which can effectively accomplish the foregoing objectives, even with a conveyor delivering randomly intermixed automotive wheel models to the inspection station.

It is yet another object of the present invention to provide such a system wherein different models are adapted for through software-contained information and operations, which obviate the need for model change hardware.

It is a further object of the present invention to provide such a system, which will function effectively with a plurality of different types of reference features.

These and other objects of the present invention will be more fully understood from the following detailed description of the invention on reference to the illustrations appended hereto.

DESCRIPTION OF THE PREFERRED EMBODIMENTS

As employed herein, the term "automotive wheel" means metal wheels on which pneumatic tires will be mounted and shall expressly include, but not be limited to, wheels for automobiles, sport utility vehicles, trucks, busses, airplanes, campers, trailers, mobile homes, motorcycles and bicycles.

As employed herein, the term "reference feature" shall refer to a local feature on an automotive wheel, which feature facilitates positioning of the automotive wheel in a proper orientation for inspection or subsequent fabrication processes.

As employed herein "camera" means a device which can obtain an image on the basis of non-contacting vision of an automotive wheel or a portion thereof, and emit a corresponding analog or digitized electrical signal which can be delivered to an electronic processor such as a computer and shall expressly include, but not be limited to, a charged coupled device, an array of self-scanning photodiodes, and a digital camera.

As employed herein, the term "image information" refers to the output of a camera containing information corresponding to the image recorded by the camera.

As employed herein with reference to an automotive wheel, the term "model" means a wheel of specific size, shape and material.

Figure 1:
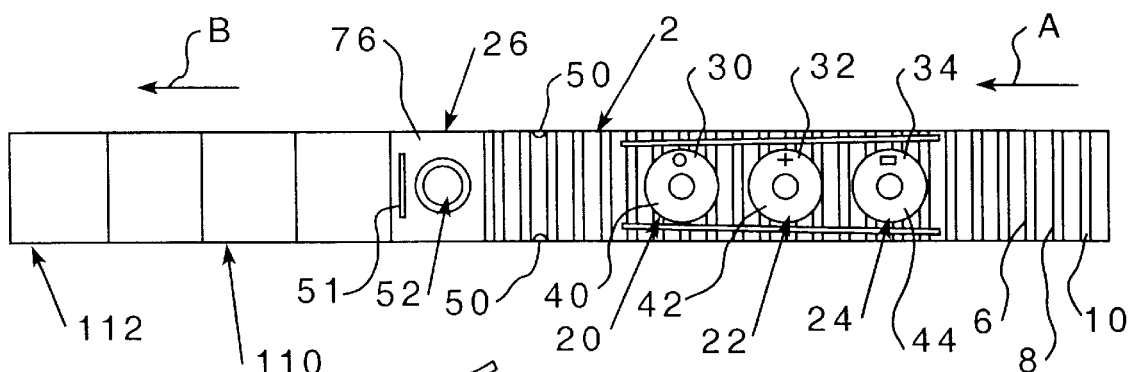
FIG. 1 is a partially schematic top plan view of a conveyor delivering, sequentially, a series of automotive wheels to an inspection station of the present invention.

Referring to FIG. 1, there is shown an automotive wheel transport conveyor 2, which may consist of a plurality of rollers such as rollers 6, 8, 10, for example, which may either, under the influence of gravity, if the conveyor is sloped, or having at least some of the rollers driven. If desired, other suitable means of conveyance can be employed. The automotive wheels such as wheels 20, 22, 24 to move toward inspection station 26 in the direction, indicated by arrow A, and to move out of inspection station 26 in the direction indicated by arrow B. Each automotive wheel 20, 22, 24 may be made of a suitable metal such as a cast aluminum wheel having integrally formed a reference feature. The reference feature may be in letters, numbers, or graphics, or combinations thereof. Examples shown in FIG. 1 are the upwardly projecting or recessed diamond-shaped feature 30 on wheel 20, with the cross-shaped feature 32, which may be upwardly projecting or recessed in wheel 22 and the generally rectangular reference feature 34, which may be upwardly projecting or recessed within wheel 24. Each wheel 20, 22, 24 has a central opening 40, 42, 44 respectively.

In the inspection cycle of the present invention, it will be desired to have the reference features such as 30, 32, 34 positioned in a particular angular position so that subsequent fabrication or processing steps which may, for example, mill the hole for a valve stem or establish the lug nut holes in the wheel, will provide such positioning precisely.

The wheels 20, 22, 24 in the present invention, may each be of different models and may be sequentially inspected at inspection station 26 without requiring any mechanical structural changes in the inspection station as the model of the wheel will be determined through the vision system. The information or parameters employed for the particular model will be stored within the computer or processor or be available through a computer network that receives the output from the camera disposed at the inspection station 26 to thereby apply the proper standards to each model of the wheel. As a result, it will be appreciated that random admixture of various wheel models may be employed, unlike numerous prior art systems which require a shutdown and mechanical alteration of the structure of the inspection station before a different model wheel can be inspected.

As shown in FIG. 1, upstream from the inspection station 26 is a photo-detector 50 monitoring the presence and size of the wheel entering the inspection station 26. A safety stop 51 is at the end of inspection station 26. The wheel 60 (FIG. 2) is positioned so that the wheel support 52 may have its upwardly projecting portion enter the opening 57 of wheel 60 shown in FIG. 2 and have its annular flange 54 in underlying supporting relationship with respect to wheel 60.

Figure 2:
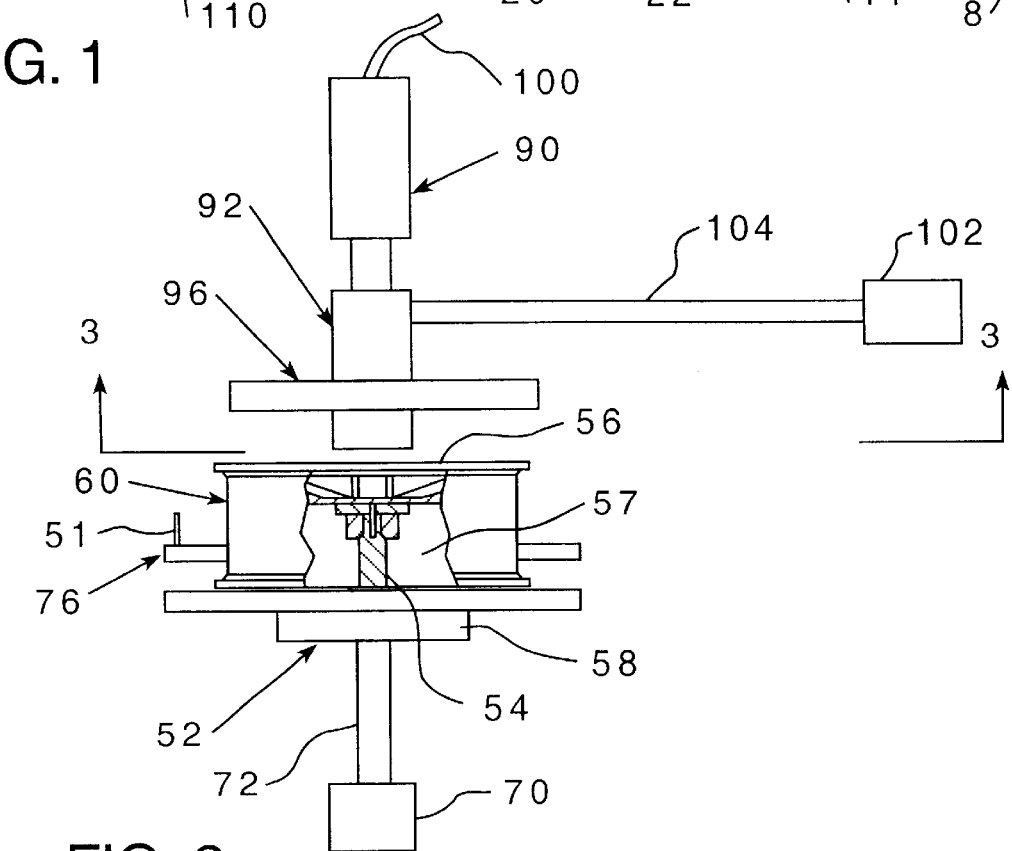
FIG. 2 is an elevational view of a form of inspection station of the present invention.
Figure 3:
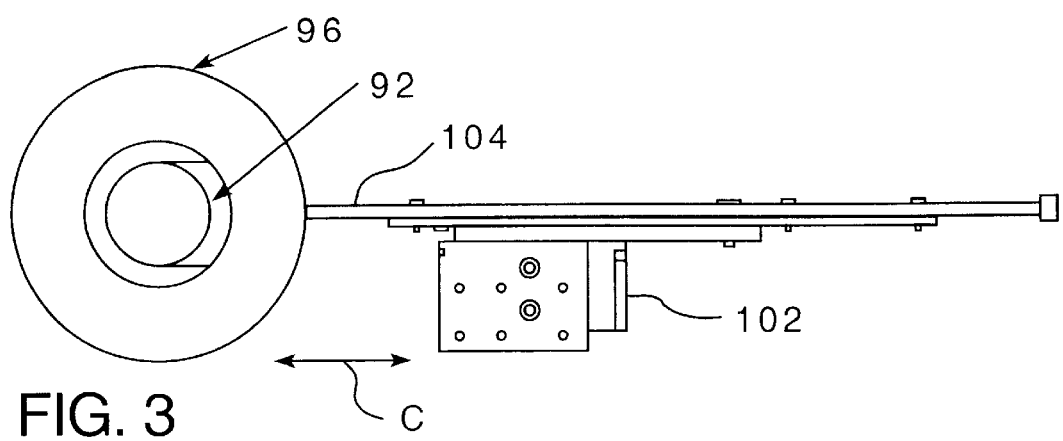
FIG. 3 is a cross-sectional illustration taken through 3—3 of FIG. 2.

In one preferred method of operation, the wheel will arrive at the inspection station in a horizontal position and will contact stop-member 51, which will emit a signal to the processor to confirm the presence of a wheel in the inspection station. Subsequently, motor 70 which could be a stepping motor on servo motor, for example will, through its output shaft 72, cause the wheel support-member 52 to have its upper portion 54 enter opening 54 and elevate the wheel 60 off of inspection table 76. In this supported position, the weight of the wheel 60, as shown in FIG. 2, on flange 54, will permit a rotation of the wheel support-member to cause precise rotation of the wheel 60. Once the wheel is at the desired elevation, with reference to FIGS. 2 and 3, the camera 90, which has zoom lens 92 and is centered over the wheel 60, will, under the influence of light source 96, which is preferably an annular florescent light source, obtain an initial image and emit responsive digital electrical signals over line 102, to the processor in a manner which will be discussed hereinafter. The first image obtained with the apparatus shown as in FIG. 2 will generally image the entire upper surface 56 of the automotive wheel 60. In a manner to be described hereinafter, if the reference feature such as 30, 32 or 34 is 3 not in the desired position, the automotive wheel support 52, will be subjected to rotation to move the reference feature 30, 32, 34 toward the desired location. It will be appreciated that more than one rotational movement of the wheel may be required to place the reference feature within the desired field of view. For simplicity of reference herein, such initial position whether effected in a single rotation of the wheel or a plurality of such rotations shall be deemed to provide the first image. The camera 90, zoom lens 92 and annular light source 96, are then moved, preferably in a linear direction under the influence of motor 102 and shaft 104 to a position closer to the reference feature. Such movement may generally be in one of the two directions indicated by arrow C in FIG. 3. The zoom lens 92 may then be operated to achieve the desired field of view, which would be less for the second or zoomed image than for the first full view image. The image information is then delivered to the processor which, again, compares the actual position of the reference feature with the desired position and, if a determination is made that the reference feature is not in the desired position as compared with stored information requesting the desired position, the processor initiates further rotation of the wheel 60 under the influence of wheel support 52 to position it in the desired location. After that has been accomplished, the automotive wheel may be moved to the next processing station, which is 110, which is shown in schematically in FIG. 1, with the desired indexed orientation. It may then be moved to a second processing station 112 and further processing stations, while maintaining the orientation established in the inspection station.

Figure 4:
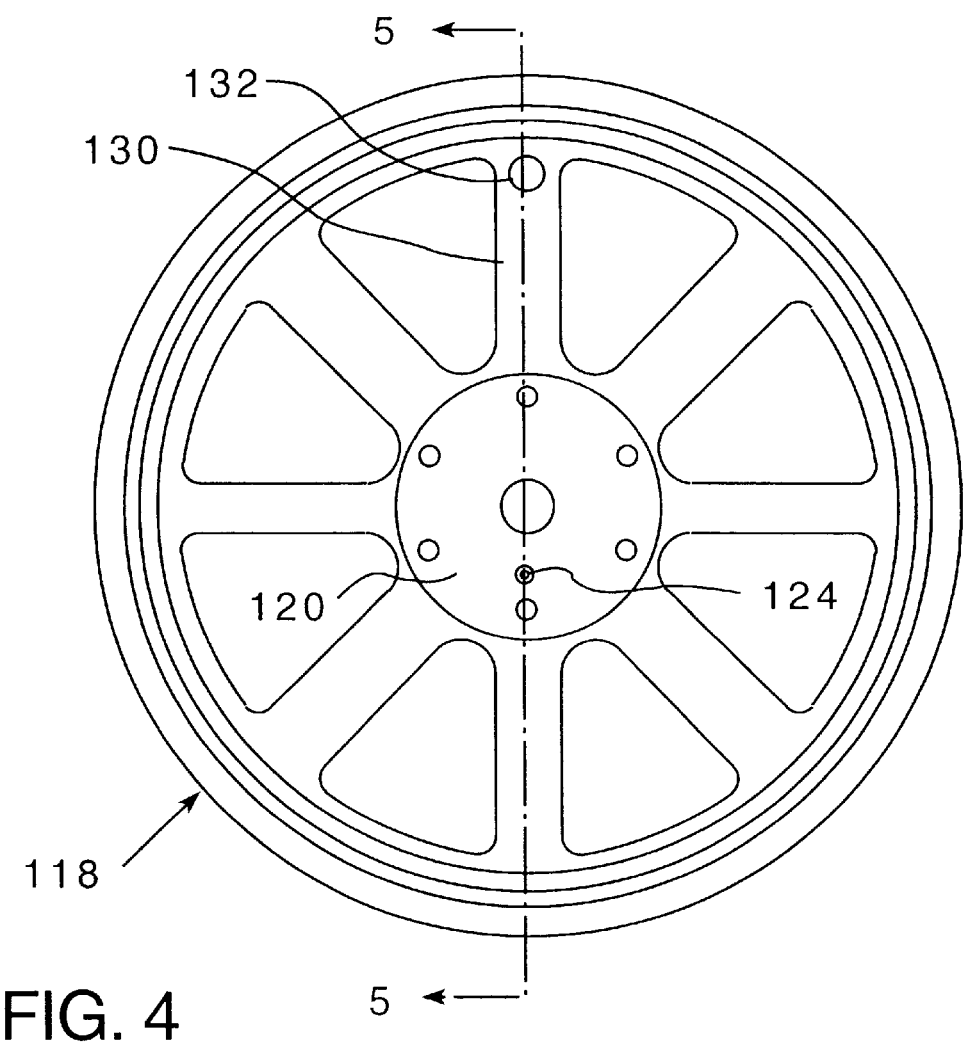
FIG. 4 is a plan view of an automotive wheel showing reference features thereon.
Figure 6:
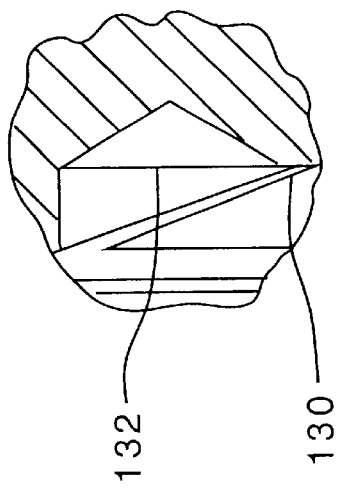
FIGS. 6 and 7 are respectively cross-sectional views of reference features of FIGS. 4 and 5.
Figure 7:
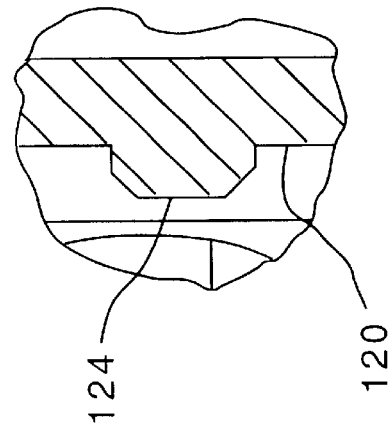
Figure 5:
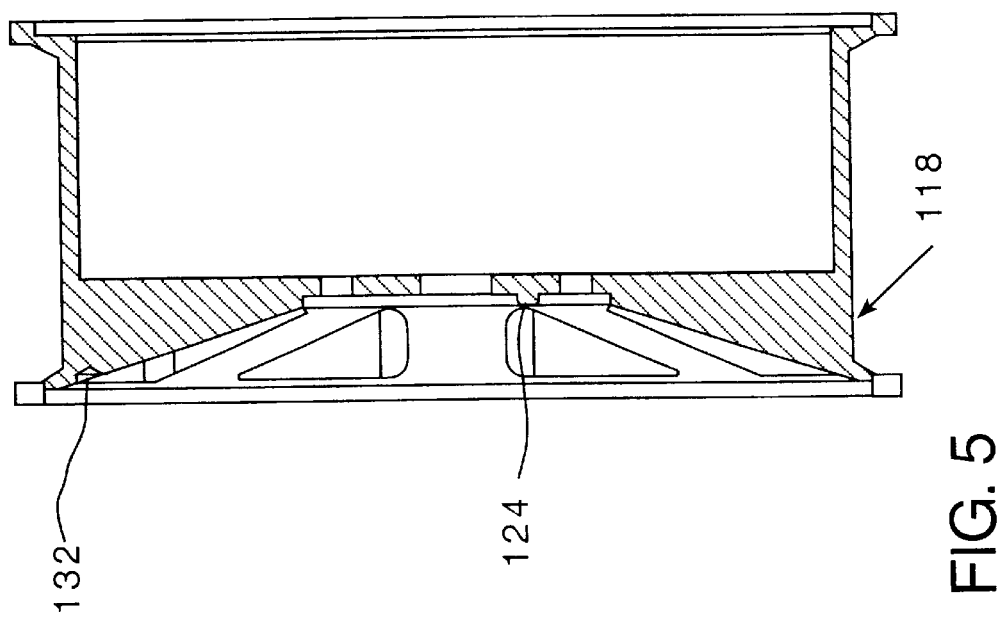
FIG. 5 is a cross-sectional view of a wheel portion of FIG. 4 taken through 5—5.

Referring to FIGS. 4 and 5, there is shown by way of an example a wheel 118 having a hub 120. The wheel 118, in the form 132 shown, has reference features 124, 132 integrally formed therein. While, generally, a wheel would typically have only one reference feature which could be placed in any desired location for purposes of illustration, the wheel of FIGS. 4 and 5 has two reference features 124, 132. Reference feature 124, as shown in FIGS. 4, 5 and 7, projects outwardly from hub 120 and is generally circular in plan. Reference feature 132, as shown in FIGS. 4, 5 and 6, is recessed and generally circular in plan. It is positioned on spoke 130.

It will be appreciated that while for purposes of example, two reference features at different locations on the wheel and having certain shapes and being either outwardly projecting or recesses have been provided, numerous other locations, numbers and shapes of reference features may be employed, depending upon the nature of the wheel, the precision with which the wheel must be positioned for subsequent processing and other considerations. Such variations are within the scope of the present invention.

Figure 8:
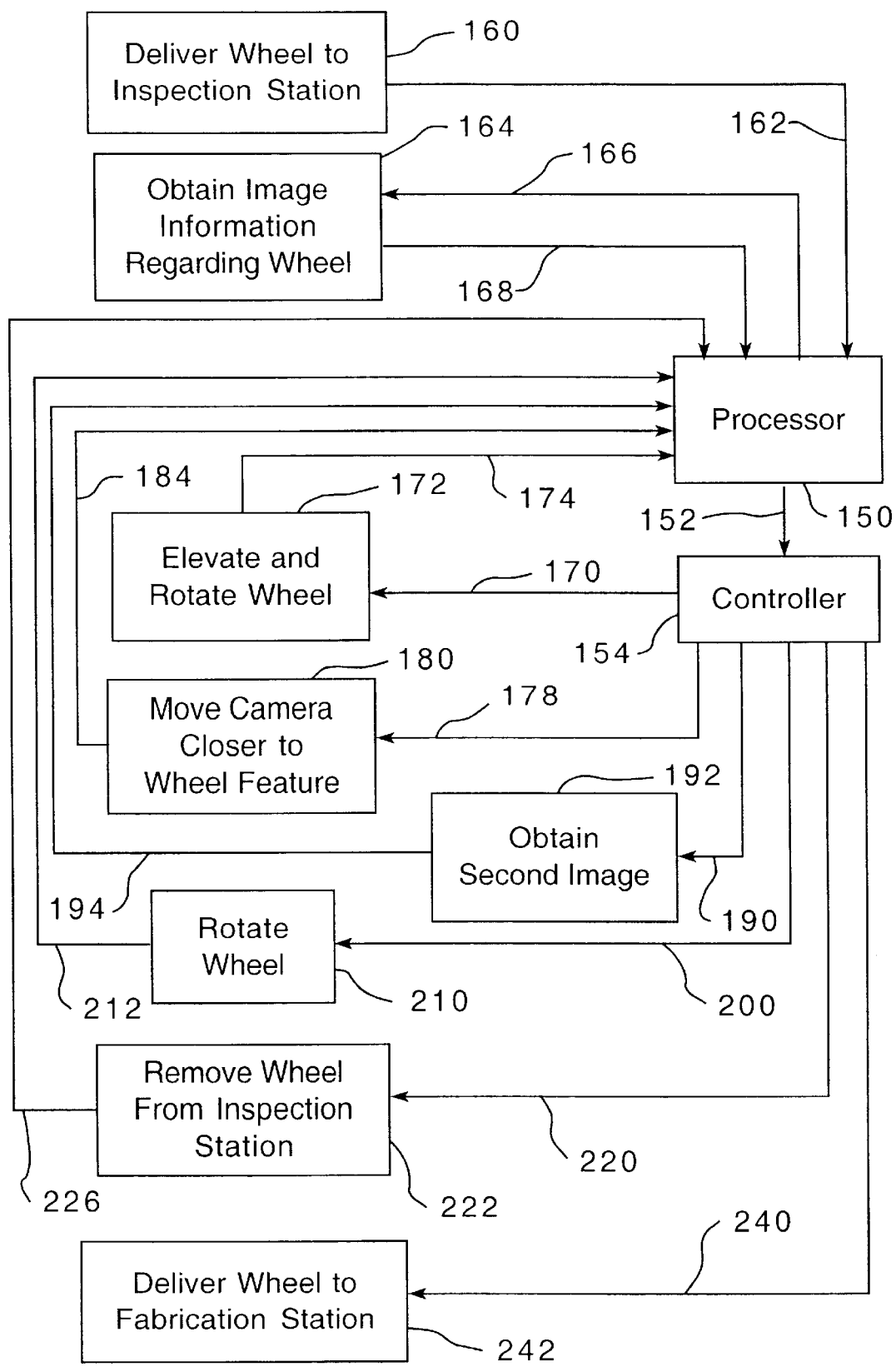
FIG. 8 is a schematic illustration of the method and apparatus for controlling the method of the present invention.

Referring now to FIG. 8, a cycle of operation of a method employing the preferred apparatus will be considered by way of example. Referring to FIG. 8, it will be seen that a processor 150, which may be any sort of computer or microprocessor having adequate capacity to store the required software and data, and effect the various processing of data received from the inspection system, may be employed. With respect to many functions of the processor 150, an output signal 152 will be delivered to controller 154 that in turn will cause certain action within the physical system.

The inspection process begins with delivery of an automotive wheel to the inspection station 160, receipt of which is communicated by signal 162 to processor 150. The inspection station will then obtain a first image 164 from the wheel through the vision system, including the camera 90 and zoom lens 92, with the benefit of illumination from illumination source 96. The initiation of the first image will be responsive to a signal 166 provided by processor 150, with the first image information 168 being delivered to the processor. If the first effort does not result in the camera "seeing" the reference feature, the wheel may be rotated about 90 degrees, for example, to visualize the reference feature and create the first image. On the basis of the first image information 168, the processor 150 will determine what model wheel is being inspected and whether the reference feature is in the desired position. If not, it will through controller 154 cause a signal 170 to cause the automotive wheel support 52 to elevate and rotate the automotive wheel 172 and provide a signal to processor 174, confirming that this has been accomplished. The controller 154 then emits a signal 178 to cause the motor 102, and its associated shaft 104, to move the camera along with its zoom lens and associated light source 180 closer to the real feature of interest. A signal 184 is provided to the processor 150 to confirm that this has been accomplished. After that, the processor 150 emits a signal to controller 154, which then emits a signal 190 to obtain a zoomed second image 192 from this different vantage point, which second mark information 194 is delivered to the processor 150. The processor 150 compares the second image information with the stored desired position of the reference feature and if the reference feature is not at the desired angular position, the controller 154, responsive to a signal from processor 150, emits a signal 200 to rotate wheel 210 to position the reference feature to the desired location. This is communicated by way of an output signal 212 to processor 150. When confirmation of the desired position has been achieved, the controller 154, responsive to signal from processor 150, emits a signal 220 to cause removal of the wheel 222 from the inspection station 26, with a signal 226 to the processor 150 confirming that this has been accomplished. The removal may be effected by any desired means, which will retain the automotive wheel in the desired angular position, which was established at the inspection station 26 and may, for example, be a clamping mechanism which can be transported to first work station 110, second work station 112 and any subsequent work stations while maintaining the desired angular position.

It will be appreciated from the foregoing that the present invention has provided an effective method and associated apparatus for automatic inspection and positioning of an automotive wheel with reference to a reference feature through a vision system operating under the influence of a suitably programmed processor such that inspection of various wheel models may be accomplished rapidly and efficiently through controlling software and data stored therein as well as data provided thereto, without requiring shutdown and changes in the mechanical structure of the inspection system.

While, for simplicity of disclosure herein, reference has been made to a integrally formed projecting or recessed reference features, it will be appreciated that, if desired, a reference feature may be provided with a different color or other visibly perceivable feature which may or may not involve a substantial recess or substantial projection.

Whereas particular embodiments of the invention have been described herein for the purposes of illustration, it will be evident to those skilled in the art that numerous variations of the details may be made without departing from the invention as set forth in the appended claims.

We claim:

1. A method of inspecting an automotive wheel having a reference feature comprising, providing an inspection station having a light source for illuminating said wheel and a camera having a zoom lens, positioning an automotive wheel in said inspection station and illuminating said wheel with said light source, employing said camera to obtain a first image providing first image information of said wheel from a first position and delivering image information to a processor, employing said processor to determine the position of said reference feature and if it is not in the desired position rotating said automotive wheel to move said reference feature toward said desired position, moving said light source camera and zoom lens to a second position closer to said reference feature, employing said camera to obtain a second image of said automotive wheel and providing second image information to said processor, and employing said processor to determine the position of said reference feature and if it is not in the desired position rotating said automotive wheel to move said reference feature to said desired position.

2. The method of inspecting an automotive wheel of claim 1 including, obtaining said first image with said zoom lens in a first position, and obtaining said second image with said zoom lens in a second position closer to said wheel than said first position.

3. The method of inspecting an automotive wheel of claim 1 including, effecting said movement of said light source, camera and zoom lens from said first position to said second position through linear movement thereof.

4. The method of inspecting an automotive wheel of claim 2, including employing said first image information to determine which model automotive wheel is being inspected, and employing said processor to effect said inspection in accordance with parameters programmed for said specific model.

5. The method of inspecting an automotive wheel of claim 4, including repeating said cycle with a plurality of automotive wheels at least some of which are of a different model without requiring a physical change in the structure of said inspection station.

6. The method of inspecting an automotive wheel of claim 5, including after said automotive wheel inspection delivering said automotive wheel to a first work station while preserving the orientation of said automotive wheel reference feature.

7. The method of inspecting an automotive wheel of claim 1, including providing said processor with a signal confirming the presence of said automotive wheel to be inspected within said inspection station before initiating said inspection.

8. The method of inspecting an automotive wheel of claim 7, including subsequent to said confirmation of said automotive wheel being disposed within said inspection station but prior to obtaining said first image elevating said automotive wheel.

9. The method of inspecting an automotive wheel of claim 8, including positioning said automotive wheel generally horizontally during said inspection.

10. The method of inspecting an automotive wheel of claim 9, including providing a controller for controlling operation of portions of the inspection system responsive to signals received by said controller from said processor.

11. The method of inspecting an automotive wheel of claim 1, including employing as said light source an annular florescent light source.

12. The method of inspecting an automotive wheel of claim 1, including obtaining said first image with substantially the entire upper surface of said automotive wheel including said reference feature being included, and obtaining said second image with less than the entire upper surface being included.

13. The method of inspecting an automotive wheel of claim 2, including positioning said zoom lens in said obtaining of said second image being positions closer to said automotive wheel than in obtaining said first image.

14. The method of inspecting an automotive wheel of claim 1, including obtaining said second image employing a smaller field of view than was employed in obtaining said first image.

15. The method of inspecting an automotive wheel of claim 1, including positioning said camera and said zoom lens substantially along the center of the central axis of said wheel when obtaining said first image.

16. The method of claim 1 including employing two said reference features.

17. The method of claim 1 including employing as a said reference feature at least one projection.

18. The method of claim 1 including employing as a said reference feature at least one recess.

19. Apparatus for inspecting an automotive wheel having a reference feature comprising an automotive wheel support for receiving, elevating and rotating said automotive wheel, a light source overlying said automotive wheel support, a camera and zoom lens overlying said automotive wheel support, a processor for receiving first image information from a first image of substantially the entire upper surface of said automotive wheel, and effecting a comparison between the desired position of said reference feature and the actual position thereof and if the desired feature is not in the desired position initiating rotation of said automotive wheel to move said reference feature toward said desired position, and said processor being structured to receive second image information from a second image of a portion of said automotive wheel including said reference feature and effecting a comparison between the desired reference feature position and the actual reference feature position and if the reference feature is not in the desired position, initiating rotation of said automotive wheel to move said reference position to said desired position, and an actuator for moving said light source, said camera and zoom lens between a first position for obtaining said first image and a second position for obtaining said second image, wherein said second position is closer to the reference feature than said first position.

20. Apparatus for inspecting an automotive wheel of claim 19 including, said processor being structured on the basis of said first image information to determine the model of said automotive wheel and employ stored information regarding the same during said inspection.

21. Apparatus for inspecting an automotive wheel of claim 20 including, a controller for effecting operation of the system components responsive to output signals received from said processor.

22. Apparatus for inspecting an automotive wheel of claim 21 including, a conveyor for delivering a plurality of automotive wheels to said automotive wheel support sequentially.

23. Apparatus for inspecting an automotive wheel of claim 22 including, said conveyor being structured to deliver said automotive wheels in a generally horizontal orientation.

24. Apparatus for inspecting an automotive wheel of claim 23 including, a photo-detector for confirming the presence of an automotive wheel to be inspected.

25. Apparatus for inspecting an automotive wheel of claim 19 including, said camera and said zoom lens having a smaller field of view in obtaining said second image than in obtaining said first image.

26. Apparatus for inspecting an automotive wheel of claim 19 including, said light source being an annular florescent light source.

27. Apparatus for inspecting an automotive wheel of claim 19 including, said camera and said zoom lens being centered over said automotive wheel support when said first image is obtained.

28. Apparatus for inspecting an automotive wheel of claim 19 including, said actuator being structured to move said light source, said camera and said zoom lens in a generally linear path.

29. Apparatus for inspecting an automotive wheel of claim 28 including an automotive wheel receiver for removing an inspected automated wheel, and delivering it to a first work station while maintaining the angular position of said reference feature.

30. Apparatus for inspecting an automotive wheel of claim 19 including said automotive wheel support being structured to project upwardly into said wheel.

\* \* \* \* \*

UNITED STATES PATENT AND TRADEMARK OFFICE
CERTIFICATE OF CORRECTION

PATENT NO. : 6,831,996 B1
DATED : December 14, 2004
INVENTOR(S) : David B. Williams et al.

It is certified that error appears in the above-identified patent and that said Letters Patent is hereby corrected as shown below:

Column 5,
Line 1, "is 3 not" should read -- is not --.

Column 7,
Lines 5 and 6, "said wheel and a camera having a zoom lens." should be on the same line as "illuminating".

Signed and Sealed this

Third Day of May, 2005

JON W. DUDAS
*Director of the United States Patent and Trademark Office*